United States Patent [19]

Lewis

[11] 4,029,181

[45] June 14, 1977

[54] CAPILLARY ACTION BRAKE SHOE

[76] Inventor: Nathanial Henry Lewis, Box 20424, Los Angeles, Calif. 90006

[22] Filed: May 17, 1976

[21] Appl. No.: 679,606

[52] U.S. Cl. .............................. 188/250 B; 188/24; 188/73.1
[51] Int. Cl.² ......................................... F16D 69/00
[58] Field of Search ............... 188/24, 73.1, 250 R, 188/250 B, 250 E, 250 G, 251 R, 251 A, 264 A, 264 AA

[56] References Cited

UNITED STATES PATENTS

| 480,982 | 8/1892 | Wohlfarth | 188/251 R |
| 841,294 | 1/1907 | Whitcomb | 188/251 A |
| 1,751,167 | 3/1930 | Norton | 188/251 R |
| 2,122,405 | 7/1938 | Bockius et al. | 188/251 R |
| 3,684,062 | 8/1972 | Johnson | 188/251 A |
| 3,807,533 | 4/1974 | Ohtani | 188/250 B |
| 3,840,093 | 10/1974 | Hamayasu | 188/250 B |

FOREIGN PATENTS OR APPLICATIONS

| 499,508 | 3/1951 | Belgium | 188/24 |
| 1,072,013 | 9/1954 | France | 188/24 |
| 2,109,907 | 9/1971 | Germany | 188/251 A |

Primary Examiner—Trygve M. Blix
Assistant Examiner—Edward R. Kazenske

[57] ABSTRACT

An improved shoe for rim brakes having conventional cleats comprising embedded secondary cleats; the cleats are level with the shoe's face. Each secondary cleat absorbs liquids by capillary action. Each cleat generates high friction when slid together with a hard rim, when both are wet.

2 Claims, 7 Drawing Figures

CAPILLARY ACTION BRAKE SHOE

The present invention relates to an improved shoe for rim brakes. Rim brakes are very simple and economical, their great advantages, and thereby very popular. Rim brakes braking force is greatly reduced when a rim becomes wet, their great disadvantage. The said improved shoe, a combination of a conventional shoe and embedded secondary cleats (cleat inserts), will greatly reduce this problem.

The objects and advantages of said invention will become better understood hereinafter, from a consideration of the specification; with reference to the accompanying drawings forming part thereof, and in which like parts throughout the several views of said invention, and wherein.

Figure 1:
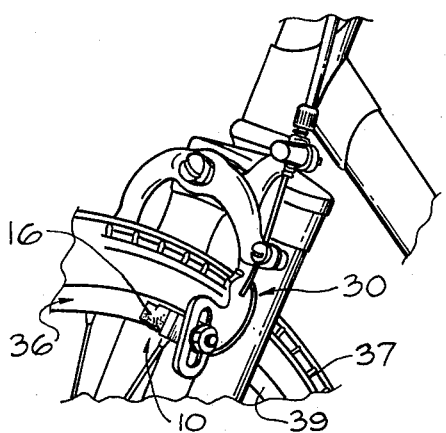
FIG. 1 is a fragmentary perspective view of a rim brake assembly-wheel assembly combination.

Refer to FIG. 1. A holder assembly 10 with a shoe 16 is shown mounted to a rim brake assembly 30, and in combination with a wheel assembly 36 comprising a tire 37 and a rim 39.

Figure 2:
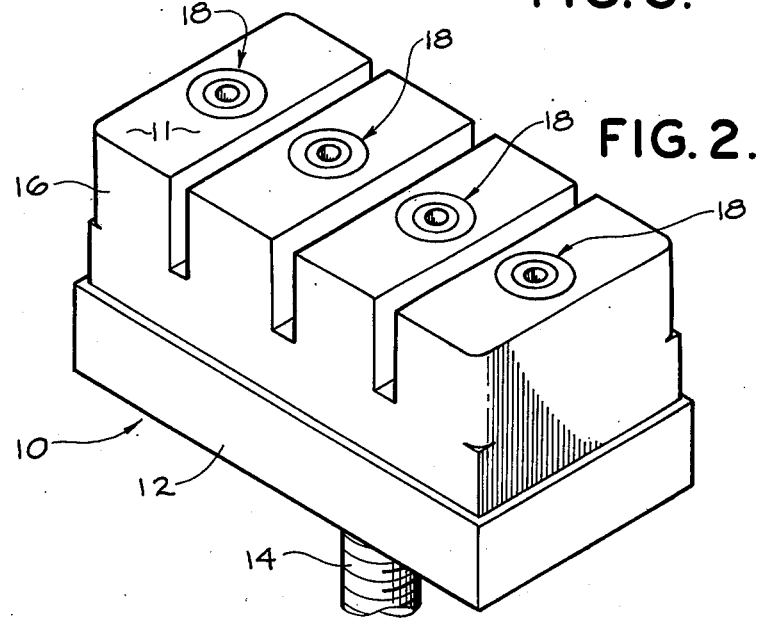
FIG. 2 is an enlarged perspective view of the shoeholder assembly shown in FIG. 1 with fragmented bolt.

Refer to FIG. 2. The holder assembly 10 comprises a cup 12 and bolt 14 holding a shoe 16. The shoe 16 with conventional cleats comprises embedded secondary cleats 18; they are centered and level with the shoe's face 11. The number of cleats 18 can vary from one to many. The embedded secondary cleats comprises the novelty of said invention.

Figure 3:
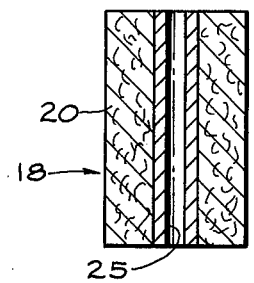
FIG. 3 is an enlarged sectional view of a cylindrical secondary cleat shown removed from said shoe.

Refer to FIG. 3. The body 20 of a cleat 18 should be made of a material with properties of the following: good resistance to wear; relative softness, cause no damage to a rim; radiates heat well; absorbs liquids by capillary action, and generates high friction when slid together with a wet hard rim. The tubular support post 25 should be made of a relative soft material as well.

The selections of materials for the body 20 are fibres and fabrics (fibers), leathers, or a combination thereof. The selections of materials for the post 25 are soft metals or alloys, such as lead and brass; or plastics, such as nylon and dacron.

Figure 4:
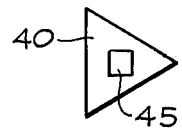
FIG. 4 is a plan top view of an alternative secondary cleat.
Figure 5:
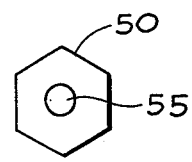
FIG. 5 is a plan top view of an alternative secondary cleat.
Figure 6:
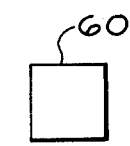
FIG. 6 is a plan top view of an alternative secondary cleat.

The dimensions or shapes of the body 20 or the post 25 are not limited in any way. Shown in FIG. 4 is a secondary cleat with a triangular body 40 and a square post 45. Shown in FIG. 5 is a secondary cleat with a hexagon body 50 and a solid circular post 55. Shown in FIG. 6 is a square secondary cleat 60 without a post.

Figure 7:
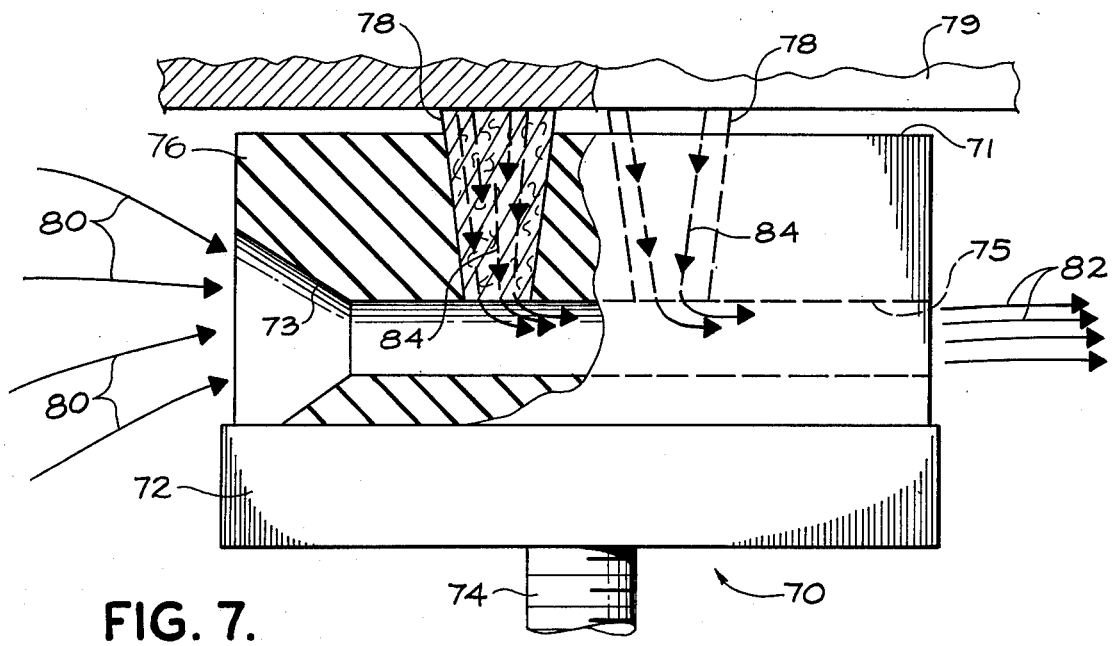
FIG. 7 is a fragmentary top view, of an advance version of said invention with a rim.

Refer to FIG. 7. This advance shoe 76 has its embedded secondary cleats (taper ones) 78 protruding slightly above the shoe's face 71, approximately one and one-half millimeters is sufficient. The cleats 78 are shown pressed against a wet rim 79. The incoming air 80 is shown entering a conical inlet 73. The faster out going air 82 will carry away heat and liquid vapor 84. Both the forward facing inlet 73 and the rearward longitudinal hole 75 can be lined with a metal or an nonmetal. The secondary cleats 18 or 78 can be embedded into a shoe without conventional cleats, as well.

Refer back to FIGS. 1, 2, and 3. Each cleat 18 should have an overall diameter of six or seven millimeters, its height should be three-fourth the depth of the shoe 16. Each cleat 18 should have a body 20 made from a fiber with the above properties and a post 25 made of lead. Prototypes of other versions were built and tested, but the above version is the one that should get first priority.

The above prototype (version) gave a 40 to 60 percentage decrease in stopping distance over conventional shoes, when the rim and the shoes were wet, with everything else being identical. And I found the ideal material to use for the cleats 18.

I soaked down the entire braking assembly(s) and wheel assembly(s) during testing with a water hose. The shoes and rim were thoroughly wet much greater than most wet-weather conditions. When pressed together, wet; the rim and shoes makes a rubbing noise which is normal and not a great nuisance.

It is an important object of this invention to provide an necessity for bikes, wherein said invention is particularly characterized by its simplicity and economy in construction, manufacture and operation.

The selection of the material for each part of said invention, will be a compromise between economic and durability desired, and will be left to the manufacturer. Having thus described said invention, it is to be understood that certain modifications in the construction and arrangement of the parts thereof will be made, as believed necessary, without departing from the scope of the attached claims.

The following is claimed:

1. A brake shoe for a rim brake assembly of a bicycle having a wheel rim, said brake shoe comprising an elongated body member of frictional material and having one face thereof with a plurality of cleat inserts embedded therein, said cleat inserts being made from an absorbent material having capillary action and frictional properties, said cleat inserts having a first face thereof exposed on said face of said body member to contact said rim, said body member having a longitudinal hole extending therethrough from end to end thereof and being parallel to said face of said body member, said cleat inserts having a second face adjacent and communicating with said longitudinal hole, thereby upon movement of said bicycle and rotation of said wheel rim air is forced through said longitudinal hole causing a suction of heat and liquid vapor through said cleat inserts when said rim is wet and said brake shoe is in contact with said rim.

2. A brake shoe as claimed in claim 1, wherein said longitudinal hole has a diameter at one end greater than the diameter of the other end thereof.

* * * * *